United States Patent
Hou

(10) Patent No.: US 10,887,280 B2
(45) Date of Patent: Jan. 5, 2021

(54) CLOUD PLATFORM SECURITY ACHIEVEMENT

(71) Applicant: New H3C Technologies Co., Ltd, Zhejiang (CN)

(72) Inventor: Yefei Hou, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 369 days.

(21) Appl. No.: 15/745,372

(22) PCT Filed: Aug. 8, 2016

(86) PCT No.: PCT/CN2016/093909
§ 371 (c)(1),
(2) Date: Jan. 16, 2018

(87) PCT Pub. No.: WO2017/025005
PCT Pub. Date: Feb. 16, 2017

(65) Prior Publication Data
US 2018/0212929 A1    Jul. 26, 2018

(30) Foreign Application Priority Data

Aug. 7, 2015 (CN) .......................... 2015 1 0478224

(51) Int. Cl.
*H04L 29/06* (2006.01)
*H04L 12/46* (2006.01)
*G06F 9/455* (2018.01)

(52) U.S. Cl.
CPC ...... *H04L 63/0245* (2013.01); *G06F 9/45558* (2013.01); *H04L 12/46* (2013.01);
(Continued)

(58) Field of Classification Search
CPC . H04L 63/0245; H04L 12/46; H04L 12/4641; H04L 12/4625; G06F 9/45558
See application file for complete search history.

(56) References Cited

U.S. PATENT DOCUMENTS 9,178,715 B2    11/2015   Jain et al.
9,215,093 B2    12/2015   Han et al.
(Continued)

FOREIGN PATENT DOCUMENTS

CN    101119276 A    2/2008
CN    102571738 A    7/2012
(Continued)

OTHER PUBLICATIONS

Fonseca et al., Openflow and SDN for Clouds, Cloud Services, Networking, and Management, Apr. 2015, First Edition, pp. 129-152 (Year: 2015).*

(Continued)

*Primary Examiner* — Kenneth W Chang
(74) *Attorney, Agent, or Firm* — McCarter & English, LLP; Kia L. Freeman; Thomas F. Foley

(57) ABSTRACT

Examples of the present disclosure provide a method and device for achieving the cloud platform security. In the present disclosure, an Openflow bridge is established on a cloud server of a cloud platform to replace a MAC bridge, the Openflow bridge may achieve the cloud platform security through an Openflow security table.

10 Claims, 6 Drawing Sheets

(52) U.S. Cl.
CPC ...... *H04L 12/4625* (2013.01); *H04L 12/4641* (2013.01); *G06F 2009/45595* (2013.01); *H04L 63/20* (2013.01)

(56) References Cited

U.S. PATENT DOCUMENTS

| | | | |
|---|---|---|---|
| 9,264,400 B1* | 2/2016 | Lin | ............... H04L 63/0245 |
| 2002/0080800 A1 | 6/2002 | Lee et al. | |
| 2007/0022474 A1 | 1/2007 | Rowett et al. | |
| 2011/0134931 A1 | 6/2011 | Merwe et al. | |
| 2011/0299533 A1 | 12/2011 | Yu et al. | |
| 2011/0317701 A1 | 12/2011 | Yamato et al. | |
| 2012/0275328 A1 | 11/2012 | Iwata et al. | |
| 2012/0324442 A1 | 12/2012 | Barde | |
| 2013/0054761 A1 | 2/2013 | Kempf et al. | |
| 2013/0070762 A1 | 3/2013 | Adams et al. | |
| 2013/0103817 A1 | 4/2013 | Koponen et al. | |
| 2013/0195113 A1 | 8/2013 | Kotha et al. | |
| 2013/0250770 A1 | 9/2013 | Zou et al. | |
| 2013/0254891 A1 | 9/2013 | Onoda | |
| 2013/0301425 A1 | 11/2013 | Udutha et al. | |
| 2014/0119367 A1 | 5/2014 | Han et al. | |
| 2014/0146674 A1 | 5/2014 | Wang et al. | |
| 2014/0241247 A1* | 8/2014 | Kempf | ............... H04L 12/4641 370/328 |
| 2014/0280547 A1* | 9/2014 | DeCusatis | ............... H04L 67/34 709/204 |
| 2015/0110116 A1 | 4/2015 | Gong | |
| 2015/0139238 A1* | 5/2015 | Pourzandi | ............... H04L 45/64 370/392 |
| 2016/0127272 A1 | 5/2016 | Wang et al. | |
| 2016/0205048 A1* | 7/2016 | Zhu | ............... H04L 45/38 370/409 |
| 2016/0315785 A1* | 10/2016 | Dronadula | ............... H04L 12/4633 |
| 2016/0337372 A1 | 11/2016 | Togawa | |
| 2018/0212929 A1 | 7/2018 | Hou | |

FOREIGN PATENT DOCUMENTS

| | | |
|---|---|---|
| CN | 102739549 A | 10/2012 |
| CN | 102857416 A | 1/2013 |
| CN | 103081418 A | 5/2013 |
| CN | 4283756 | 1/2015 |
| CN | 104394083 | 3/2015 |
| CN | 104468389 A | 3/2015 |
| CN | 104518993 | 4/2015 |
| CN | 104823416 A | 8/2015 |
| CN | 104823428 A | 8/2015 |
| WO | 2012077603 A1 | 6/2012 |
| WO | 2013/015825 A1 | 1/2013 |
| WO | 2013150925 A1 | 10/2013 |
| WO | 2015000386 A1 | 1/2015 |

OTHER PUBLICATIONS

Congdon et al., "Simultaneously Reducing Latency and Power Consumption in Open Flow Switches", Jun. 2014, IEEE/ACM Transactions on Networking, vol. 22, No. 3, pp. 1007-1020 (Year: 2014).*
International Search Report and Written Opinion for Application No. PCT/CN2014/081042, dated Sep. 24, 2014, 8 pages.
"Award-winning Software-defined Networking ProgrammableFlow Controller", NEC Corportiation, Aug. 8, 2012.
"Big Virtual Switch", Big Switch Networks, Inc., Aug. 1, 2013.
"Ethernet-based Software Defined Network (SDN)", Y.F. Juan (Jun. 2, 2013).
"Multi-tenant traffic in virtualized network environments", sFlow, Apr. 22, 2013.
"Software Defined Networking (SDN) in the Enterprise", enterasys Networks, Inc., Jul. 27, 2012.
International Search Report and Written Opinion in PCT/CN2016/093909 dated Oct. 26, 2016.

* cited by examiner

CLOUD PLATFORM SECURITY ACHIEVEMENT

BACKGROUND

The security is always a required characteristic of each cloud platform, in the current open source cloud platform and non-open source cloud platform, the cloud platform security is achieved through an Internet Protocol (IP) table and a layer-2 Media Access Control (MAC) forwarding table which are dynamically learned.

An open source cloud platform, Openstack, is taken as an example, and the non-open cloud platform has the similar principle. FIG. 1 is a schematic diagram illustrating any one of cloud servers in the Openstack. As shown in FIG. 1, an original bridge (such as a qbr bridge, which is also called MAC bridge) of a linux kernel, such as the MAC bridge_1, MAC bridge_2, MAC bridge_3, may achieve the Openstack security through a IP table and a layer-2 MAC forwarding table which are dynamically learned. It is taken as an example that Virtual Machine (VM) 1 shown in FIG. 1 sends a packet to VM2, VM1 sends a packet to VM2 via an interface eth0 of VM1, the MAC bridge receives the packet sent by VM1 at an port Veth1 of the MAC bridge through a Virtual ethernet (Veth) of VM1, filters and identifies the packet relying on an IP table dynamically learned before, and forwards the filtered packet relying on a layer-2 MAC forwarding table dynamically learned before.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

The MAC bridge on a cloud server of the Openstack achieves the Openstack security based on a IP table and a layer-2 MAC forwarding table, but the controllability of the IP table and the layer-2 MAC forwarding table is poor, and is much weaker than that of an Openflow table. In addition, entries on other bridges, such as an internal bridge (BR-Int), or an external bridge (BR-Ext), on the cloud server of the cloud platform are all Openflow tables, therefore, on the same cloud server, the IP table and the layer-2 MAC forwarding table on the MAC bridge and the Openflow tables on other bridges are not uniform.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

Figure 1:
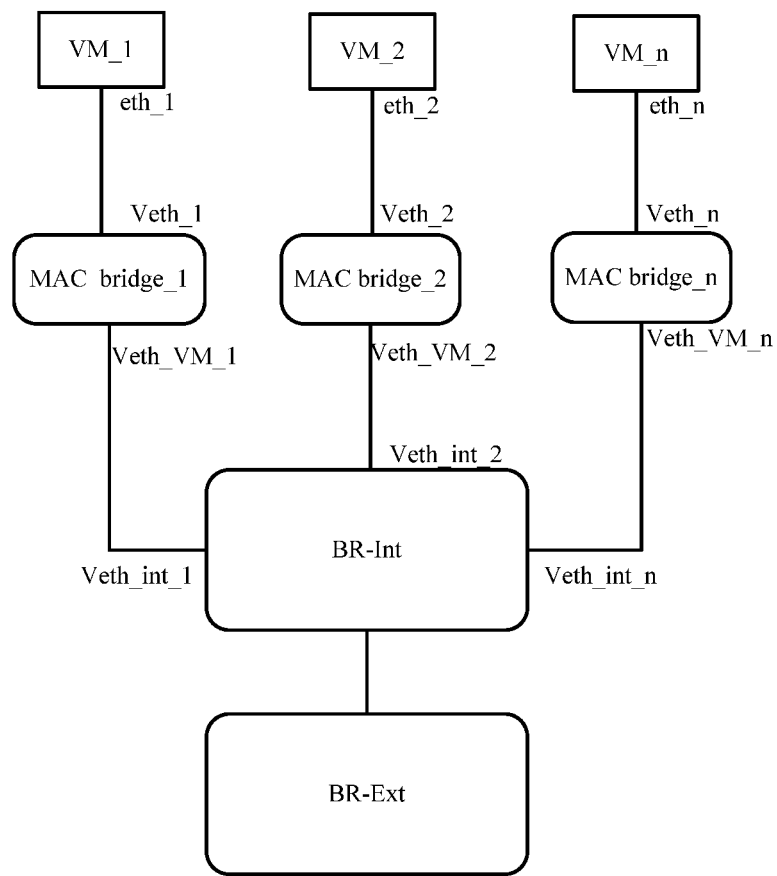
FIG. 1 is a schematic diagram illustrating any one of cloud servers in the Openstack.
Figure 2:
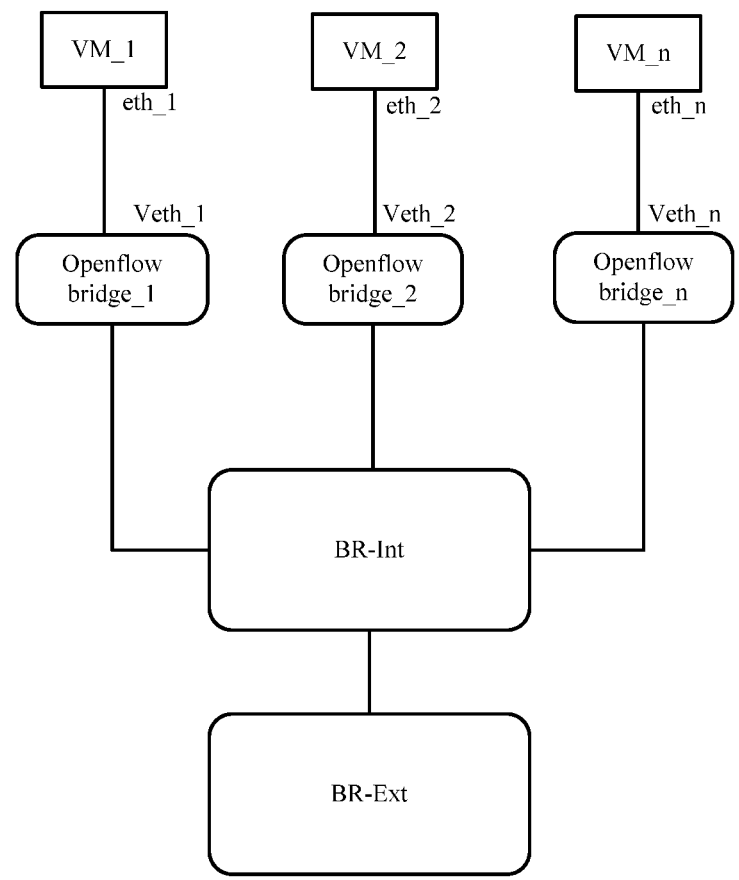
FIG. 2 is a schematic diagram illustrating any one of cloud servers in a cloud platform according to examples of the present disclosure.

In the present disclosure, in order to achieve the cloud platform security based on an Openflow table, an Openflow bridge is established on the cloud server of the cloud platform to replace the MAC bridge. FIG. 2 is a schematic diagram illustrating any one of cloud servers in a cloud platform according to examples of the present disclosure. As shown in FIG. 2, the position of the Openflow bridge is the same as that of the MAC bridge, namely, the Openflow bridge is connected between a VM and the BR-int. Compared to the MAC bridge which achieves the cloud platform based on the IP table and the layer-2 MAC forwarding table dynamically learned, the Openflow bridge achieves the cloud platform based on a preconfigured Openflow security table.

In the present disclosure, the Openflow security table may include multiple Openflow security entries, and each of the Openflow security entries may include two parts, namely a matching condition and a forwarding action.

As an example, the matching condition may include a port receiving a packet, and a packet attribute parameter carried in the packet. In an example, the packet attribute parameter carried in the packet may include a five-tuple array and/or a seven-tuple array of the packet. The five-tuple array of the packet may include a destination IP address, a source IP address, a destination port number, a source port number, and a protocol type. The seven-tuple array of the packet may include a destination IP address, a source IP address, a destination MAC address, a source MAC address, a destination port number, a source port number, and a protocol type.

As an example, the forwarding action may be a forwarding action performed on a packet matching the Openflow security table. It will be described in detail that how to forward a packet according to the forwarding action in the Openflow security table later.

The process of achieving the cloud platform security by an Openflow bridge based on a preconfigured Openflow security table will be described hereinafter.

Figure 3A:
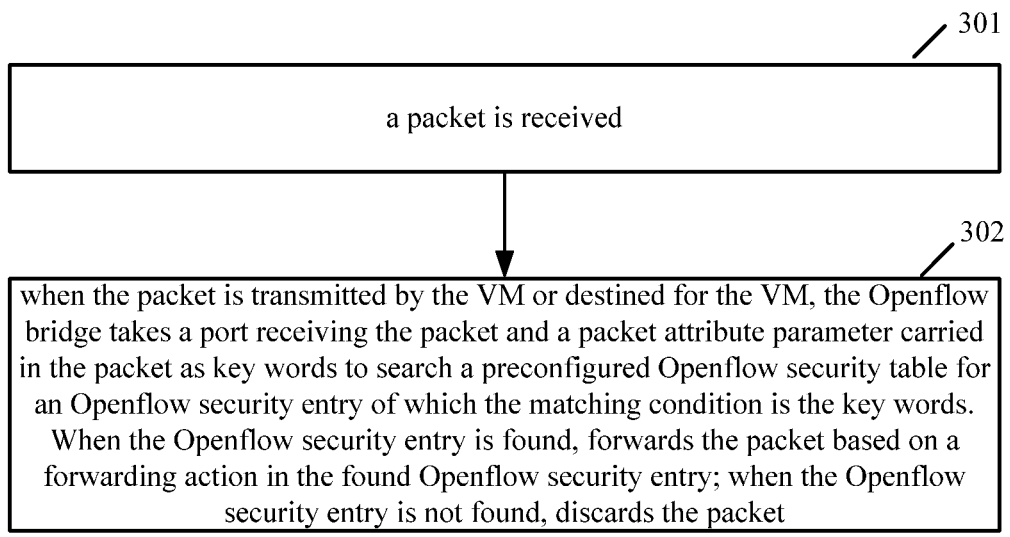
FIG. 3A is a flow diagram illustrating a method for achieving the cloud platform security based on an Openflow table according to examples of the present disclosure.

FIG. 3A is a flow diagram illustrating a method for achieving the cloud platform security based on an Openflow table according to examples of the present disclosure. The method may be applied to the above-mentioned Openflow bridge. As shown in FIG. 3A, the method may include the following processes.

At block 301, a packet is received.

The packet may be a first packet transmitted by a VM, or a second packet destined for the VM. The VM may be a local VM.

It should be noted that, the "first" packet and the "second" packet are only used to distinguish the packet transmitted by a VM and the packet destined for the VM.

At block 302, when the packet is transmitted by the VM or destined for the VM, the Openflow bridge takes a port receiving the packet and a packet attribute parameter carried in the packet as key words, and searches a preconfigured Openflow security table for an Openflow security entry of which the matching condition is the key words. When the Openflow security entry is found, forwards the packet based on a forwarding action in the found Openflow security entry; when the Openflow security entry is not found, discards the packet.

To facilitate description, when the Openflow bridge receives the first packet transmitted by the VM, the Openflow bridge may be called a source Openflow bridge; when the Openflow bridge receives the second packet destined for the VM, the Openflow bridge may be called a destination Openflow bridge. Block 302 will be described in detail by taking it as an example that the Openflow bridge is taken as a source Openflow bridge or a destination Openflow bridge.

A source Openflow bridge takes a first port receiving the first packet and a packet attribute parameter carried in the first packet as the first key words, and searches a preconfigured Openflow security table for an Openflow security entry of which the matching condition is the first key words. When the Openflow security entry is found, forwards the first packet based on a forwarding action in the found Openflow security entry; otherwise, discards the first packet.

A destination Openflow bridge takes a second port receiving the second packet and a packet attribute parameter carried in the second packet as the second key words, and searches a preconfigured Openflow security table for an Openflow security entry of which the matching condition is the second key words. When the Openflow security entry is found, forwards the second packet via the first port based on a forwarding action in the found Openflow security entry; otherwise, discards the second packet.

As an example, the forwarding the second packet based on the forwarding action in the found Openflow security entry may include: transmitting the second packet to the VM via the first port, which is connected to the VM through the Openflow bridge.

Figure 3B:
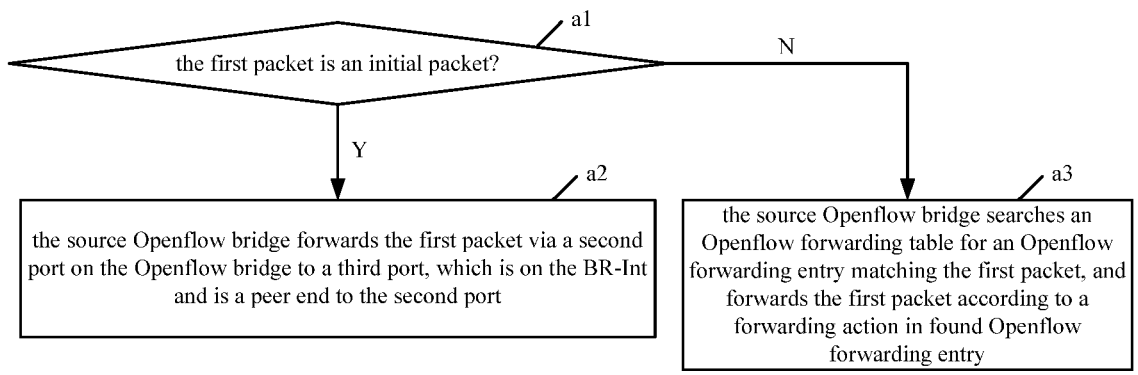
FIG. 3B is flow diagram illustrating a process for forwarding the first packet by the source Openflow bridge based on a forwarding action in a found Openflow security entry according to examples of the present disclosure.

As an example, FIG. 3B is flow diagram illustrating a process for forwarding the first packet by the source Openflow bridge based on the forwarding action in the found Openflow security entry. As shown in FIG. 3B, the process may include the followings.

At block a1, the Openflow bridge determines whether the first packet is an initial packet, when the first packet is an initial packet, the block a2 is performed; when the first packet is not an initial packet, the block a3 is performed.

At block a2, the source Openflow bridge forwards the first packet via a second port on the Openflow bridge to a third port, which is a peer end to the second port. The third port is on the BR-Int.

Block a2 is performed when the first packet is the initial packet.

In the present disclosure, when the first packet is the initial packet, after the source Openflow bridge forwards the first packet via the second port on the Openflow bridge to a third port, which is a peer end to the second port, the first packet may arrive at the third port. After receiving the first packet via the third port, the BR-Int may search an Openflow forwarding table for an Openflow forwarding entry matching the first packet, the Openflow forwarding entry may be denoted as entry 1, and forward the first packet according to a forwarding action in found table 1.

When the destination device of the first packet is another VM in the same cloud server, the forwarding action in the table 1 found by the BR-Int may be: transmitting the first packet via a fourth port on the BR-Int to a fifth port, which is on an Openflow bridge connected to the destination device and is a peer end to the fourth port. The Openflow bridge connected to the destination device may be called the destination Openflow bridge. Based on the forwarding action, the BR-Int may transmit the first packet via the fourth port on the BR-Int to the fifth port, which is on the destination Openflow bridge and is a peer end to the fourth port. When the destination Openflow bridge receives the first packet via the fifth port, because the first packet is destined for the VM, the destination Openflow bridge will search the preconfigured Openflow security table, according to the fifth port receiving the first packet and the packet attribute parameter carried in the first packet, for an Openflow security entry matching the first packet, when the Openflow security entry is found, the Openflow security entry may be denoted as entry 2, and transmit the first packet, via an egress port connected to the destination device, to the destination device according to a forwarding action in the found entry 2; otherwise, discard the first packet.

When the destination device of the first packet is a host in a physical network or a VM in another cloud server, the forwarding action in the table 1 found by the BR-Int may be: transmitting the first packet via a sixth port on the BR-Int to a seventh port, which is on a BR-Ext and is a peer end to the sixth port. Based on the forwarding action, the BR-Int may transmit the first packet via the sixth port on the BR-Int to the seventh port, which is on the BR-Ext and is a peer end to the sixth port. When receiving the first packet via the seventh port, the BR-Ext will search the Openflow forwarding table for an Openflow forwarding entry matching the first packet, the Openflow forwarding entry may be denoted as entry 3, and forward the first packet according to a forwarding action in the found entry 3. The forwarding action in the found table 3 may be: performing Virtual eXtensible Local Area Network (VXLAN) encapsulation on the first packet, transmitting the VXLAN-encapsulated first packet via a physical port (A route egress port via which the destination device may be arrived at) on the BR-Ext. Finally, the first packet will arrive to the destination device.

Based on above description about that when the first packet is an initial packet sent to the destination device and the destination device is another VM on the same cloud server, the first packet is forwarded by the source Openflow bridge, the BR-Int and the destination Openflow bridge; or about that when the first packet is an initial packet sent to the destination device and the destination device is a host on a physical network or a VM on another cloud server, the first packet is forwarded by the source Openflow bridge, the BR-Int and the BR-Ext, in the present disclosure, a controller on the cloud platform, such a SDN controller, may further dynamically generate an Openflow forwarding entry for forwarding the first packet, the generated Openflow forwarding entry may be denoted as entry 4, and send the entry 4 to the source Openflow bridge to store. For example, the entry 4 may be stored in the Openflow forwarding table of the source Openflow bridge.

In the present disclosure, when the first packet is an initial packet sent to the destination device and the destination device is another VM on the same cloud server, based on a non-repetitive principle, the entry 4 may be formed by Openflow entries, which match the first packet and are respectively searched out when the first packet passes the source Openflow bridge, the BR-Int and the destination Openflow bridge. For instance, when the first packet is an initial packet sent to the destination device and the destination device is another VM on the same cloud server, based on the description of forwarding the first packet by the source Openflow bridge, the BR-Int and the destination Openflow bridge, the matching condition of the entry 4 may be a combination of a matching condition in an Openflow security entry which matches the first packet and is searched out when the first packet passes the source Openflow bridge, a matching condition in an Openflow forwarding entry which matches the first packet and is searched out when the first packet passes the BR-Int, and a matching condition in an Openflow security entry which matches the first packet and is searched out when the first packet passes the destination Openflow bridge; and the final combined matching condition has no duplicate content. The forwarding action of the entry 4 may be a combination of a forwarding action in an Openflow security entry which matches the first packet and is searched out when the first packet passes the source Openflow bridge, a forwarding action in an Openflow forwarding entry which matches the first packet and is searched out when the first packet passes the BR-Int, and a forwarding action in an Openflow security entry which matches the first packet and is searched out when the first packet passes the destination Openflow bridge; and the final combined forwarding action may omit the middle forwarding operations, namely, only remain the forwarding operation in above mentioned entry 2.

When the first packet is an initial packet sent to the destination device and the destination device is a host on a physical network or a VM on another cloud server, based on a non-repetitive principle, the entry 4 may be formed by Openflow entries, which match the first packet and are respectively searched out when the first packet passes the source Openflow bridge, the BR-Int and the BR-Ext. For instance, when the first packet is an initial packet sent to the destination device and the destination device is a host on a physical network or a VM on another cloud server, based on the description of forwarding the first packet by the source Openflow bridge, the BR-Int and the BR-Ext, the matching condition of the entry 4 may be a combination of a matching condition in an Openflow security entry which matches the first packet and is searched out when the first packet passes the source Openflow bridge, a matching condition in an Openflow forwarding entry which matches the first packet and is searched out when the first packet passes the BR-Int, and a matching condition in an Openflow forwarding entry which matches the first packet and is searched out when the first packet passes the BR-Ext; and the final combined matching condition has no duplicate content. The forwarding action of the entry 4 may be a combination of a forwarding action in an Openflow security entry which matches the first packet and is searched out when the first packet passes the source Openflow bridge, a forwarding action in an Openflow forwarding entry which matches the first packet and is searched out when the first packet passes the BR-Int, and a forwarding action in an Openflow forwarding entry which matches the first packet and is searched out when the first packet passes the BR-Ext; and the final combined forwarding action may omit the middle forwarding operations, bur the non-forwarding operation, such as the VXLAN encapsulation will not be omitted.

Based on above description about the entry 4, when the first packet is an initial packet sent to the destination device, no matter whether the destination device is another VM on the same cloud server, or a host on a physical network or a VM on another cloud server, the entry 4 gathers Openflow entries which match the first packet and are respectively searched out when the first packet passes each of network bridges on the cloud server, thus, regarding the non-initial packet subsequently sent to the destination device, it is only required to search for an Openflow forwarding entry on the source Openflow bridge once to forward the packet to the destination device, without searching for Openflow entries on other network bridges on the cloud server, the packet forwarding efficiency may be increased. Referring to the block a3.

At block a3, the source Openflow bridge searches the Openflow forwarding table for an Openflow forwarding entry (namely the entry 4) matching the first packet, and forwards the first packet according to a forwarding action in found Openflow forwarding entry. The process is terminated.

Block a3 is performed when the first packet is not the initial packet.

It can be seen that based on above description about the entry 4, the entry 4 gathers Openflow entries which match the initial packet sent to the destination device and are respectively searched out when the initial packet passes each of network bridges on the cloud server. Subsequently, when the first packet is a non-initial packet sent to the destination device, at block a3, the source Openflow bridge may search the local Openflow forwarding table for an Openflow forwarding entry matching the first packet, namely the entry 4. Because the entry 4 gathers Openflow entries which match the initial packet sent to the destination device and are respectively searched out when the initial packet passes each of network bridges on the cloud server, at block a3, the first packet is forwarded according to the forwarding action in found Openflow forwarding entry means that the first packet is forwarded straight through each of network bridges on the cloud server. Therefore, it is only necessary to search for an Openflow forwarding entry on the source Openflow bridge once to forward the packet to the destination device, without searching for Openflow entries on other network bridges on the cloud server, thus the packet forwarding efficiency may be increased.

For example, it is taken as an example that the packet p1 is a non-initial packet sent to a destination device (which is another VM on the same cloud server), when receiving the packet p1 and finding that the packet p1 is not an initial packet sent to the destination device, the source Openflow bridge searches the local Openflow forwarding table for an Openflow forwarding entry matching the packet p1, and forwards the packet p1 according to a forwarding action in found Openflow forwarding entry. Here, the Openflow forwarding entry matching the packet p1 is a combination of Openflow entries which match an initial packet sent to the destination device and are searched out when the initial packet passes the source Openflow bridge, the BR-Int and the destination Openflow bridge. Therefore, the packet p1 is forwarded according to a forwarding action in found Openflow forwarding entry, means that packet p1 is transmitted, through the source Openflow bridge, the BR-Int and the destination Openflow bridge, to a port which is on the Openflow bridge and is connected to the destination device, and is directly forwarded via the port, without searching for Openflow entries on the BR-Int and the destination Openflow bridge.

In the present disclosure, in order to ensure the smooth implementation of block a1 to block a3, the network bridges on the same cloud server may be connected with each other via a port of which the type is Patch. Concretely, the types of the second port on the source Openflow bridge, the third port which is on the BR-Int and is a peer end to the second port, the fourth port on the BR-Int, the fifth port which is on the destination Openflow bridge and is a peer end to the fourth port, the sixth port on the BR-Int and the seventh port which is on the BR-Ext and is a peer end to the sixth port are all Patch. The port type Patch can guarantee that when the initial packet passes each Openflow network bridge (namely a network bridge possessing an Openflow entry, such as the Openflow bridge, the BR-Int and the BR-Ext) connected with another one by a port of which the type is Patch, the Openflow entries of all Openflow network bridges may be automatically combined and finally form one Openflow forwarding entry (such as the entry 4 formed in block a2) to indicate the forwarding of subsequent non-initial packets.

Above is the description of block 302.

The method shown in FIG. 3A will be further described with reference to two specific examples.

Figure 4:
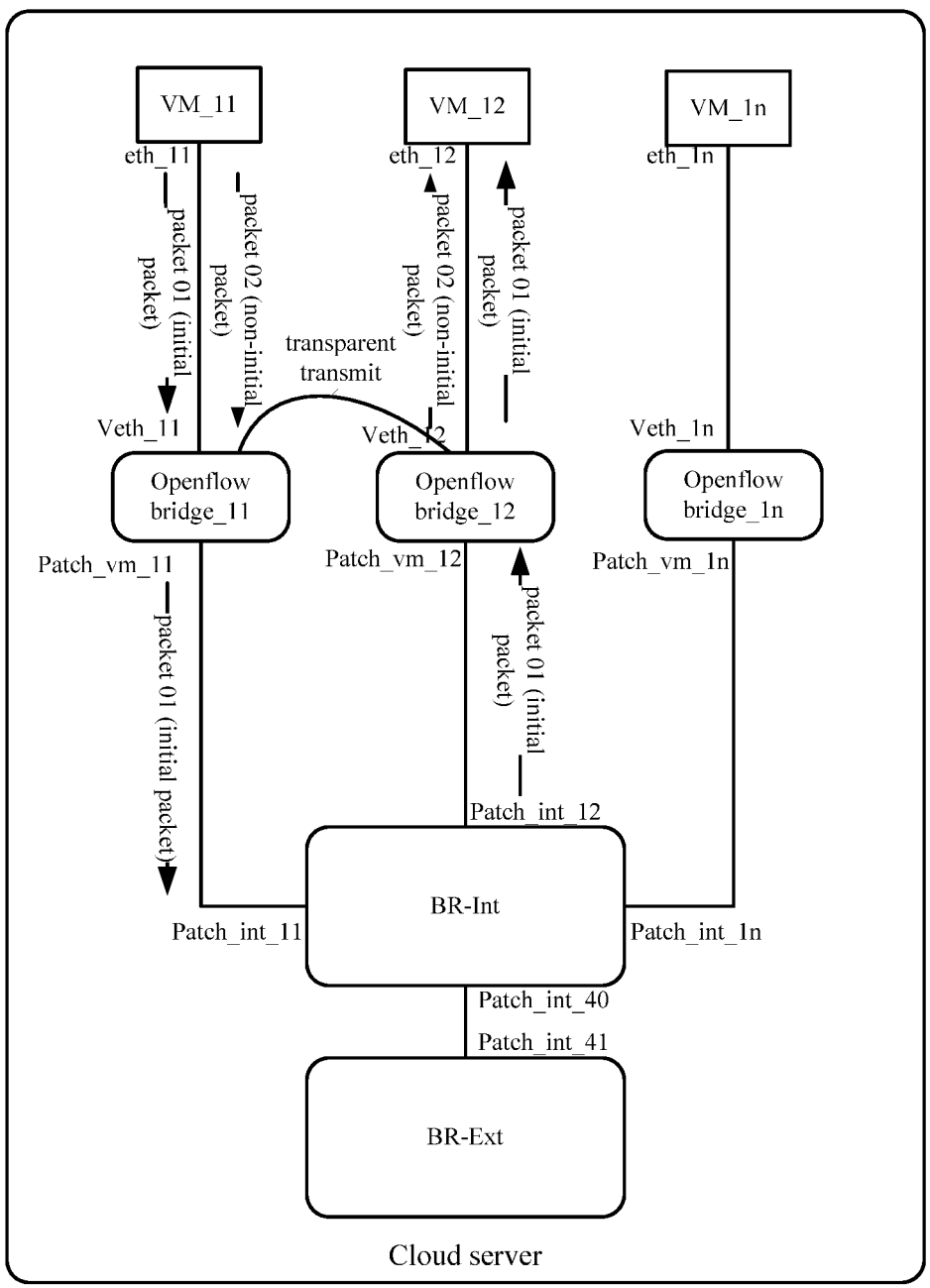
FIG. 4 is a schematic diagram illustrating an application network according to an example of the present disclosure.

FIG. 4 is a schematic diagram illustrating an application network according to an example of the present disclosure. In the application network shown in FIG. 4, the network of only one server on the cloud platform is taken as an example. As shown in FIG. 4, VM_11 is connected to the virtual network card Veth_11 on the Openflow bridge_11 via a port eth_11 of the VM_11, VM_12 is connected to the virtual network card Veth_12 on the Openflow bridge_12 via a port eth_12 of the VM_12, and so on, VM_1n is connected to the virtual network card Veth_1n on the Openflow bridge_1n via a port eth_1n of the VM_1n. In FIG. 4, the Openflow bridge_11 is connected to a port Patch_Int_11 on the BR-Int via a port Patch_VM_11 of the Openflow bridge_11, the Openflow bridge_12 is connected to a port Patch_Int_12 on the BR-Int via a port Patch_VM_12 of the Openflow bridge_12, and so on, the Openflow bridge_1n is connected to a port Patch_Int_1n on the BR-Int via a port Patch_VM_1n of the Openflow bridge_1n. The port Patch_VM_11 of the Openflow bridge_11 is a peer end to the port Patch_Int_11 on the BR-Int, and the types of the port Patch_VM_11 and the port Patch_Int_11 are Patch; the port Patch_VM_12 of the Openflow bridge_12 is a peer end to the port Patch_Int_12 on the BR-Int, and the types of the port Patch_VM_12 and the port Patch_Int_12 are Patch; and so on; the port Patch_VM_1n of the Openflow bridge_1n is a peer end to the port Patch_Int_1n on the BR-Int, and the types of the port Patch_VM_1n and the port Patch_Int_1n are Patch. In FIG. 4, The BR-Int is connected to a port Patch_41 on the BR-Ext via a port Patch_40 of the BR-Int, and the types of the port Patch_40 and the port Patch_41 are Patch. In FIG. 4, the VM_11, VM_12 to VM_1n, the Openflow bridge_11, Openflow bridge_12 to Openflow bridge_1n, the BR-Int and the BR-Ext are located at the same cloud server.

In the example, it is taken as an example that VM_11 accesses VM_12.

The VM_11 sends a packet for accessing the VM_12 via the port eth_11. To facilitate description, the packet may be denoted as packet 01.

The Openflow bridge_11 receives the packet 01 via the port Veth_11, learns that the Openflow bridge_11 receives a packet for accessing the VM_12 by the VM_11 for the first time (namely the packet 01 is an initial packet), and takes the Veth_11 and a packet attribute parameter carried in the packet 01 as key words to search a local preconfigured Openflow security table for an Openflow security entry of which the matching condition is the key words.

If failing to search out the Openflow security entry, the Openflow bridge_11 may directly discard the packet 01.

If searching out the Openflow security entry (the Openflow security entry may be denoted as entry 41), the Openflow bridge_11 may send the packet 01 via the port Patch_VM_11 of the Openflow bridge_11 according to a forwarding action in the entry 41.

When receiving the packet 01 via the port Patch_Int_11, the BR-Int may search a local Openflow forwarding table for an Openflow forwarding entry matching the packet 01 (the Openflow forwarding entry may be denoted as entry 42), and forward the packet 01 via the port Patch_Int_12 according to a forwarding action in the entry 42.

The Openflow bridge_12 receives the packet 01 via the port Patch_VM_12, and learns that the packet 01 is destined for the VM_12, and takes the Patch_VM_12 and a packet attribute parameter carried in the packet 01 as key words to search a local preconfigured Openflow security table for an Openflow security entry of which the matching condition is the key words. When the Openflow security entry is searched out, the Openflow security entry may be denoted as entry 43, and the Openflow bridge_12 may forward the packet 01 via the port Veth_12 of the Openflow bridge_12 according to the forwarding action in the entry 43. Finally, the packet 01 sent by the VM_11 will arrive at the VM_12. Thus, it is achieved that VM_11 accesses VM_12.

During the process of forwarding the packet 01 from the Openflow bridge_11 to the BR-Int to the Openflow bridge_12, the SDN controller on the cloud platform may further combine the entry 41 searched out when the packet 01 passes the Openflow bridge_11, the entry 42 searched out when the packet 01 passes the BR-Int, and the entry 43 searched out when the packet 01 passes the Openflow bridge_12 to generate an Openflow forwarding entry matching the packet 01 (the Openflow forwarding entry may be denoted as entry 40), and send the entry 40 to the Openflow bridge_11 to be stored in the Openflow forwarding table. The matching condition of the entry 40 is a non-repeating combination of matching conditions in the entry 41 to entry 43, and the forwarding action of the entry 40 is a non-repeating combination of forwarding actions in the entry 41 to entry 43. Here, it is taken as an example that the forwarding action is: forwarding the packet via the port Veth_12 of the Openflow bridge_12.

Subsequently, when the VM_11 accesses the VM_12 again, the VM_11 sends the packet for accessing the VM_12 via the port eth_11. To facilitate description, the packet may be denoted as packet 02.

The Openflow bridge_11 receives the packet 02 via the port Veth_11, and learns that the packet 02 is not the first packet for accessing the VM_12 by the VM_11 received by the Openflow bridge_11 (namely the packet 02 is not an initial packet), searches a local Openflow forwarding table for an Openflow forwarding entry matching the packet 02 (namely the above entry 40 generated by the SDN controller).

The Openflow bridge_11 transparent transmits the packet 02 to the port Veth_12 of the Openflow bridge_12 according to a forwarding action in the found entry 40, and enables the Openflow bridge_12 to forward the packet 02 via the Veth_12. Finally, the packet 01 sent by the VM_11 will arrive at the VM_12. Thus, it is achieved that VM_11 accesses VM_12.

Figure 5:
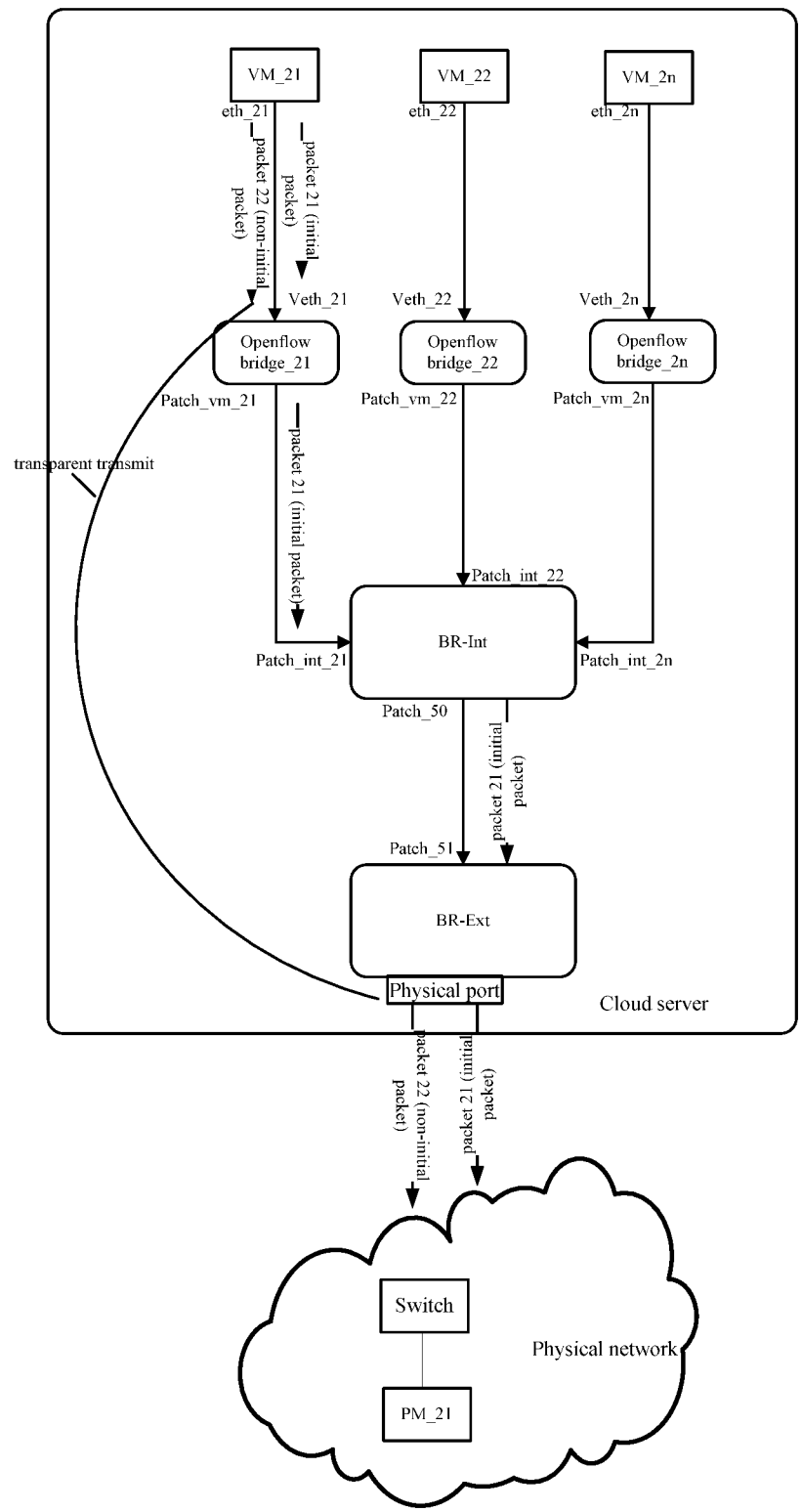
FIG. 5 is a schematic diagram illustrating an application network according to another example of the present disclosure.

FIG. 5 is a schematic diagram illustrating an application network according to another example of the present disclosure. In the application network shown in FIG. 5, the network of only one server on the cloud platform is taken as an example. As shown in FIG. 5, VM_21 is connected to the virtual network card Veth_21 on the Openflow bridge_21 via a port eth_21 of the VM_21, VM_22 is connected to the virtual network card Veth_22 on the Openflow bridge_22 via a port eth_22 of the VM_22, and so on, VM_2n is connected to the virtual network card Veth_2n on the Openflow bridge_2n via a port eth_2n of the VM_2n. In FIG. 5, the Openflow bridge_21 is connected to a port Patch_Int_21 on the BR-Int via a port Patch_VM_21 of the Openflow bridge_21, the Openflow bridge_22 is connected to a port Patch_Int_22 on the BR-Int via a port Patch_VM_22 of the Openflow bridge_22, and so on, the Openflow bridge_2n is connected to a port Patch_Int_2n on the BR-Int via a port Patch_VM_2n of the Openflow bridge_2n. The port Patch_VM_21 of the Openflow bridge_21 is a peer end to the port Patch_Int_21 on the BR-Int, and the types of the port Patch_VM_21 and the port Patch_Int_21 are Patch; the port Patch_VM_22 of the Openflow bridge_22 is a peer end to the port Patch_Int_22 on the BR-Int, and the types of the port Patch_VM_22 and the port Patch_Int_22 are Patch; and so on; the port Patch_VM_2n of the Openflow bridge_2n is a peer end to the port Patch_Int_2n on the BR-Int, and the types of the port Patch_VM_2n and the port Patch_Int_2n are Patch. In FIG. 5, The BR-Int is connected to a port Patch_51 on the BR-Ext via a port Patch_50 of the BR-Int, and the types of the port Patch_50 and the port Patch_51 are Patch. In FIG. 5, the VM_21, VM_22 to VM_2n, the Openflow bridge_21, Openflow bridge_22 to Openflow bridge_2n, the BR-Int and the BR-Ext are located at the same cloud server.

In the example, it is taken as an example that VM_21 accesses a host PM_21 on a physical network.

The VM_21 sends a packet for accessing the PM_21 via the port eth_21. To facilitate description, the packet may be denoted as packet 21.

The Openflow bridge_21 receives the packet 21 via the port Veth_21, learns that the Openflow bridge_21 receives a packet for accessing the PM_21 by the VM_21 for the first time (namely the packet 21 is an initial packet), and takes the Veth_21 and a packet attribute parameter carried in the packet 21 as key words to search a local preconfigured Openflow security table for an Openflow security entry of which the matching condition is the key words.

If failing to search out the Openflow security entry, the Openflow bridge_21 may directly discard the packet 21.

If searching out the Openflow security entry (the Openflow security entry may be denoted as entry 51), the Openflow bridge_21 may send the packet 21 via the port Patch_VM_21 of the Openflow bridge 21 according to a forwarding action in the entry 51.

When receiving the packet 21 via the port Patch_Int_21, the BR-Int may search a local Openflow forwarding table for an Openflow forwarding entry matching the packet 21 (the Openflow forwarding entry may be denoted as entry 52), and forward the packet 21 via the port Patch_50 according to a forwarding action in the entry 52.

The BR-Ext receives the packet 21 via the port Patch_51, and searches a local Openflow forwarding table for an Openflow forwarding entry matching the packet 21 (the Openflow forwarding entry may be denoted as entry 53), performs VXLAN encapsulation on the packet 21 according to an encapsulation operation of the forwarding action in the entry 53, and forwards the VXLAN-encapsulated packet 21 via the physical port Port_21 according to a forwarding operation of the forwarding action in the entry 53. Finally, the packet 21 sent by the VM_21 will arrive to the PM_21, namely, the VM_21 accesses the PM_21.

During the process of forwarding the packet 21 from the Openflow bridge_11 to the BR-Int to the BR-Ext, the SDN controller on the cloud platform may further combine the entry 51 searched out when the packet 21 passes the Openflow bridge_21, the entry 52 searched out when the packet 21 passes the BR-Int, and the entry 53 searched out when the packet 21 passes the BR-Ext to generate an Openflow forwarding entry matching the packet 21 (the Openflow forwarding entry may be denoted as entry 50), and send the entry 50 to the Openflow bridge_21 to be stored in the Openflow forwarding table. The matching condition of the entry 50 is a non-repeating combination of matching conditions in the entry 51 to entry 53, and the forwarding action of the entry 50 is a non-repeating combination of forwarding actions in the entry 51 to entry 53. Here, it is taken as an example that the forwarding action is: performing VXLAN encapsulation on the packet and forwarding the packet via the physical port Port_21.

Subsequently, when the VM_21 accesses the PM_21 again, the VM_21 sends the packet for accessing the PM_21 via the port eth_21. To facilitate description, the packet may be denoted as packet 22.

The Openflow bridge_21 receives the packet 22 via the port Veth_21, and learns that the packet 22 is not the first packet for accessing the PM_21 by the VM_21 received by the Openflow bridge_21 (namely the packet 22 is not an initial packet), searches a local Openflow forwarding table for an Openflow forwarding entry matching the packet 22 (namely the above entry 50 generated by the SDN controller).

The Openflow bridge_21 performs VXLAN encapsulation on the packet 22 and transparent transmits the packet 22 to the physical port Port_21 of the BR-Ext according to a forwarding action in the found entry 50, and enables the BR-Ext to forward the VXLAN-encapsulated packet 22 via the physical port Port_21. Finally, the packet 22 subsequently sent by the VM_21 will arrive at the PM_21. Thus, the VM_21 accesses the PM_21 again.

The device provided by examples of the present disclosure will be described in detail hereinafter.

Figure 6:
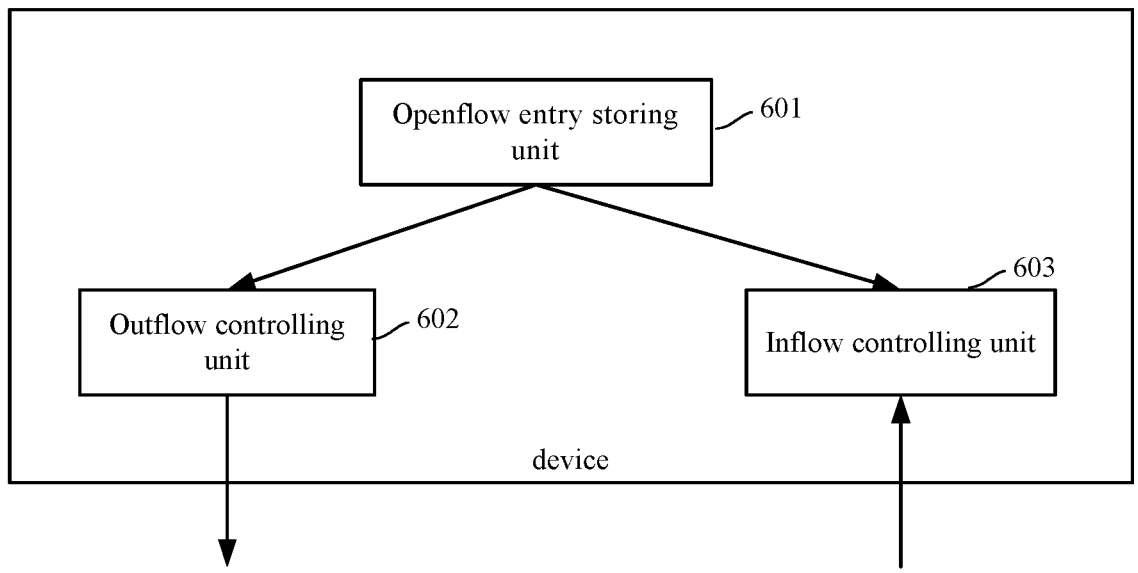
FIG. 6 is a schematic diagram illustrating a device for achieving the cloud platform security based on an Openflow table according to examples of the present disclosure.

FIG. 6 is a schematic diagram illustrating a device for achieving the cloud platform security based on an Openflow table according to examples of the present disclosure. The device may be applied to above mentioned Openflow bridge which is established on the cloud server of the cloud platform to replace the MAC bridge. The Openflow bridge may be located between a VM and a BR-Int on the cloud server. As shown in FIG. 6, the device may include: an Openflow entry storing unit 601, an outflow controlling unit 602 and an inflow controlling unit 603.

The Openflow entry storing unit 601 is configured to store a preconfigured Openflow security table.

The outflow controlling unit 602 is configured to receive a first packet sent by a local VM, take a port receiving the first packet and a packet attribute parameter carried in the first packet as first key words to search a preconfigured Openflow security table stored in the Openflow entry storing unit 601 for an Openflow security entry of which the matching condition is the first key words. When the Openflow security entry is searched out, forward the first packet based on a forwarding action in the Openflow security entry; when the Openflow security entry is not searched out, discard the first packet.

The inflow controlling unit 603 is configured to receive a second packet destined for the VM, take a port receiving the second packet and a packet attribute parameter carried in the second packet as second key words to search the preconfigured Openflow security table stored in the Openflow entry storing unit 601 for an Openflow security entry of which the matching condition is the second key words. When the Openflow security entry is searched out, forward the second packet based on a forwarding action in the Openflow security entry; when the Openflow security entry is not searched out, discard the second packet.

In an example, the Openflow entry storing unit 601 may further store an Openflow forwarding table.

Accordingly, the outflow controlling unit 602 forwarding the first packet based on a forwarding action in the Openflow security entry may include: when the first packet is an initial packet, the outflow controlling unit 602 forwarding the first packet via the second port on the Openflow bridge to a third port, which is on the BR-Int and is a peer end to the second port; when the first packet is not an initial packet, the outflow controlling unit 602 searching the Openflow forwarding table stored in the Openflow entry storing unit 601 for an Openflow forwarding entry matching the first packet, and forwarding the first packet according to a forwarding action in searched Openflow forwarding entry.

When the first packet is an initial packet, the Openflow entry storing unit 601 may further receive an Openflow forwarding entry which matches the first packet and is generated and sent by a controller on the cloud platform, and store the received Openflow forwarding entry in a local Openflow forwarding table.

When the first packet is an initial packet sent to a destination device by the VM and the destination device is another VM on the same cloud server, the Openflow forwarding entry matching the first packet is a combination of an Openflow security entry which matches the first packet and is searched out when the first packet passes the source Openflow bridge, an Openflow forwarding entry which matches the first packet and is searched out when the first packet passes the BR-Int, and an Openflow security entry which matches the first packet and is searched out when the first packet passes the destination Openflow bridge connected to the destination device; when the first packet is an initial packet sent to the destination device and the destination device is a host on a physical network or a VM on another cloud server, the Openflow forwarding entry matching the first packet is a combination of an Openflow security entry which matches the first packet and is searched out when the first packet passes the source Openflow bridge, an Openflow forwarding entry which matches the first packet and is searched out when the first packet passes the BR-Int, and an Openflow forwarding entry which matches the first packet and is searched out when the first packet passes an external bridge BR-Ext.

In an example, the Openflow bridge, the BR-Int and the BR-Ext may be connected with each other via ports of which the types are all Patch.

In an example, the inflow controlling unit 603 forwarding the second packet based on a forwarding action in the Openflow security entry may include: the inflow controlling unit 603 transmitting the second packet to the VM via a first port, which is connected to the VM through the Openflow bridge.

Figure 7:
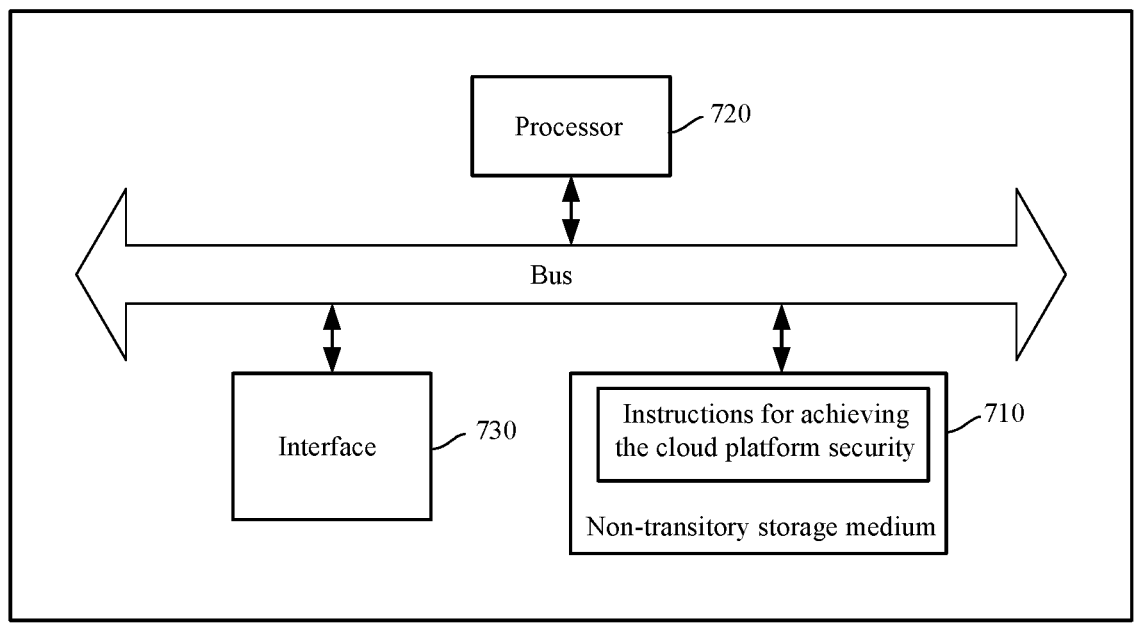
FIG. 7 is a schematic diagram illustrating the hardware structure of a device for achieving the cloud platform security based on an Openflow table according to examples of the present disclosure.

Examples of the present disclosure also provide a hardware structure of the device shown in FIG. 6. FIG. 7 is a schematic diagram illustrating the hardware structure of a device for achieving the cloud platform security based on an Openflow table according to examples of the present disclosure. As shown in FIG. 7, the device may include a storage medium 710, a processor 720 in communication with the non-transitory storage medium 710 and an interface 730.

The storage medium 710 may include a non-transitory storage medium, such as a memory or a storage, and configured to store a group of instructions which may be executed by the processor 620 to implement the operations of any one of the methods for achieving the cloud platform security based on an Openflow table shown in FIG. 3A to FIG. 5, or the operations of the units in the device for achieving the cloud platform security based on an Openflow table shown in FIG. 6.

In an example, it can be understood that the storage medium 710 may store the Openflow entry storing unit 601, the outflow controlling unit 602 and the inflow controlling unit 603 shown in FIG. 6. Accordingly, the processor 720 may execute the control program of the Openflow entry storing unit 601 to control the Openflow entry storing unit 601 in the storage medium 710 to perform above mentioned operations of the Openflow entry storing unit 601; execute the control program of the outflow controlling unit 602 to control the outflow controlling unit 602 in the storage medium 710 to perform above mentioned operations of the outflow controlling unit 602; execute the control program of the inflow controlling unit 603 to control the inflow controlling unit 603 in the storage medium 710 to perform above mentioned operations of the inflow controlling unit 603.

Examples of the present disclosure provide a method and device for achieving the cloud platform security. In the present disclosure, an Openflow bridge is established on a cloud server of a cloud platform to replace a MAC bridge, the Openflow bridge may achieve the cloud platform security through an Openflow security table. Thus the objective of achieving the cloud platform security based on an Openflow table is realized. In addition, since the Openflow bridge may achieve the cloud platform security utilizing an Openflow security table, the Openflow bridge and other network bridges, such as the BR-Int and the BR-Ext on the cloud server may adopt a uniform flow table management, thus the network configuration and management may be simplified.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for achieving the cloud platform security, the method is applied to an Openflow bridge which is established on a cloud server of a cloud platform to replace a MAC bridge, the Openflow bridge is located between a Virtual Machine (VM) and an internal bridge (BR-Int) on the cloud server, the method comprises:
receiving a packet; and
when the packet is transmitted by the VM or destined for the VM, taking a port receiving the packet and a packet attribute parameter carried in the packet as key words to search a preconfigured Openflow security table for an Openflow security entry of which the matching condition is the key words; when the Openflow security entry is searched out, forwarding the packet based on a forwarding action in the Openflow security entry; when the Openflow security entry is not searched out, discarding the packet.

2. The method according to claim 1, when the packet is transmitted by the VM and the port receiving the packet is a first port, wherein forwarding the packet based on a forwarding action in the Openflow security entry comprises:
when the packet is an initial packet, forwarding the packet via a second port on the Openflow bridge to a third port, which is on the BR-Int and is a peer end to the second port; and
when the packet is not an initial packet, searching an Openflow forwarding table for an Openflow forwarding entry matching the packet, and forwarding the packet according to a forwarding action in the Openflow forwarding entry.

3. The method according to claim 2, when the packet is an initial packet, further comprising:
receiving an Openflow forwarding entry which matches the packet and is generated and sent by a controller of the cloud platform, and storing the Openflow forwarding entry in an Openflow forwarding table;
when the packet is an initial packet sent to a destination device by the VM and the destination device is another VM on the same cloud server, the Openflow forwarding entry matching the packet is a combination of an Openflow security entry which matches the packet and is searched out when the packet passes the Openflow bridge, an Openflow forwarding entry which matches the packet and is searched out when the packet passes the BR-Int, and an Openflow security entry which matches the packet and is searched out when the packet passes a destination Openflow bridge connected to the destination device;
when the packet is an initial packet sent to the destination device and the destination device is a host on a physical network or a VM on another cloud server, the Openflow forwarding entry matching the packet is a combination of an Openflow security entry which matches the packet and is searched out when the packet passes the Openflow bridge, an Openflow forwarding entry which matches the packet and is searched out when the packet passes the BR-Int, and an Openflow forwarding entry which matches the packet and is searched out when the packet passes an external bridge BR-Ext.

4. The method according to claim 3, wherein the Openflow bridge, the BR-Int and the BR-Ext on the cloud server are connected with each other via Patch type ports.

5. The method according to claim 1, when the packet is destined for the VM, and the port receiving the packet is a second port, wherein forwarding the packet based on a forwarding action in the Openflow security entry comprises:
transmitting the packet to the VM via a first port, which is connected to the VM through the Openflow bridge.

6. A device for achieving the cloud platform security, the device is applied to an Openflow bridge which is established on a cloud server of a cloud platform to replace a MAC bridge, the Openflow bridge is located between a Virtual Machine (VM) and an internal bridge (BR-Int) on the cloud server, the device comprises: a processor and a non-transitory storage medium in communication with the processor;
the non-transitory storage medium stores a group of instructions which may be executed by the processor to:
receive a packet; and
when the packet is transmitted by the VM or destined for the VM, take a port receiving the packet and a packet attribute parameter carried in the packet as key words to search a preconfigured Openflow security table for an Openflow security entry of which the matching condition is the key words; when the Openflow security entry is searched out, forward the packet based on a forwarding action in the Openflow security entry;
when the Openflow security entry is not searched out, discard the packet.

7. The device according to claim 6, when the packet is transmitted by the VM and the port receiving the packet is a first port, the instructions which may be executed by the processor to:
when the packet is an initial packet, forward the packet via a second port on the Openflow bridge to a third port, which is on the BR-Int and is a peer end to the second port; and
when the packet is not an initial packet, search an Openflow forwarding table for an Openflow forwarding entry matching the packet, and forward the packet according to a forwarding action in the Openflow forwarding entry.

8. The device according to claim 7, when the packet is an initial packet, the instructions which may be executed by the processor further to:
receive an Openflow forwarding entry which matches the packet and is generated and sent by a controller of the cloud platform, and store the Openflow forwarding entry in an Openflow forwarding table;
when the packet is an initial packet sent to a destination device by the VM and the destination device is another VM on the same cloud server, the Openflow forwarding entry matching the packet is a combination of an Openflow security entry which matches the packet and is searched out when the packet passes the Openflow bridge, an Openflow forwarding entry which matches the packet and is searched out when the packet passes the BR-Int, and an Openflow security entry which matches the packet and is searched out when the packet passes a destination Openflow bridge connected to the destination device;
when the packet is an initial packet sent to the destination device and the destination device is a host on a physical network or a VM on another cloud server, the Openflow forwarding entry matching the packet is a combination of an Openflow security entry which matches the packet and is searched out when the packet passes the Openflow bridge, an Openflow forwarding entry which matches the packet and is searched out when the packet passes the BR-Int, and an Openflow forwarding entry which matches the packet and is searched out when the packet passes an external bridge BR-Ext.

9. The device according to claim 8, wherein the Openflow bridge, the BR-Int and the BR-Ext on the cloud server are connected with each other via Patch type ports.

10. The device according to claim 6, when the packet is destined for the VM, and the port receiving the packet is a second port, the instructions which may be executed by the processor to:

transmit the packet to the VM via a first port, which is connected to the VM through the Openflow bridge.

\* \* \* \* \*